United States Patent
Grignon

[11] Patent Number: 5,518,260
[45] Date of Patent: May 21, 1996

[54] DISABLED VEHICLE MOVER

[75] Inventor: Daniel K. Grignon, Gregory, Mich.

[73] Assignee: Chrysler Corporation, Highland Park, Mich.

[21] Appl. No.: 354,176

[22] Filed: Dec. 12, 1994

[51] Int. Cl.$^6$ .................................................. B60P 3/12
[52] U.S. Cl. ........................ 280/402; 414/426; 414/476; 414/563
[58] Field of Search ................... 414/426, 476, 414/563; 280/43.12, 402, 400

[56] References Cited

U.S. PATENT DOCUMENTS

| | | | |
|---|---|---|---|
| 3,653,330 | 4/1972 | Yard | 105/90 A |
| 4,564,207 | 1/1986 | Russ et al. | 414/563 X |
| 4,589,509 | 5/1986 | Chase | 180/74 |
| 4,678,392 | 7/1987 | Capers et al. | 414/563 |
| 4,871,291 | 10/1989 | Moore et al. | 414/563 |
| 5,350,271 | 9/1994 | Weller | 414/563 |
| 5,352,083 | 10/1994 | Roberts et al. | 414/563 X |

*Primary Examiner*—Margaret A. Focarino
*Assistant Examiner*—Michael Mar
*Attorney, Agent, or Firm*—Margaret A. Dobrowitsky

[57] ABSTRACT

A device for moving disabled vehicles in which fixed and movable jaws are carried by a self-propelled truck and function under operator control for selectively capturing coaxial vehicle tires between the jaws, and lifting the tires and vehicle so that the same may be propelled by the truck. Rollers are mounted for free rotation along the forward edges of the movable jaws for pushing engagement with the vehicle tires to propel the vehicle under control of the truck in situations where the jaws cannot be positioned beneath the vehicle tires, such as when the vehicle is on a dynamometer or inclined surface.

3 Claims, 3 Drawing Sheets

DISABLED VEHICLE MOVER

The present invention is directed to a device or for moving disabled vehicles to a repair station, a dynamometer, a test stand or the like.

BACKGROUND AND SUMMARY OF THE INVENTION

Devices of the subject character, sometimes referred to as "mules" in the art, conventionally take the form of a self-propelled truck having a bar affixed to and projecting longitudinally forwardly from the truck. A pair of laterally extending fixed jaws and a pair of laterally extending movable jaws are mounted on the bar. The movable jaws are coupled to hydraulics for pivoting the jaws between longitudinally extending parallel positions and laterally extending aligned positions opposed to and spaced from the fixed jaws. When it is desired to move a vehicle, the movable jaws are pivoted to their forward positions, the back jaws are positioned beneath coaxial vehicle tires, and the front jaws are pivoted to their lateral positions opposed to the fixed jaws in back of the tires. The entire jaw head and bar are then raised by mule hydraulics, so that the vehicle tires are captured between the jaws and raised off of the ground or floor. The vehicle can then be moved by the self-propelled truck.

A problem arises in situations where the mule jaws cannot be positioned beneath the vehicle tires for moving the vehicle, such as when pushing a vehicle onto a dynamometer or up an incline. In this situation, it has been conventional practice to mount a T-shaped head on the forward end of the mule bar for engaging the bumper of the vehicle, so that the mule can push the vehicle without the tires being captured between the jaws. However, the T-shaped head is quite heavy, and it is difficult for an operator to assemble the head to and remove the head from the mule. Furthermore, different vehicles have different bumper heights, requiring several T-shaped heads for a full product line. It is therefore a general object of the present invention to provide a device or mule for moving disabled vehicles of the described character in which the requirement for the removable heavy T-shaped heads of the prior art is eliminated. A more specific object of the present invention is to provide a disabled vehicle mover or mule of the described character in which the entire device is provided as an integral assembly requiring no assembly or disassembly by an operator for moving disabled vehicles to a repair station, a dynamometer, a test stand or the like.

In accordance with the present invention, the need for the T-shaped pusher heads of the prior art described immediately above is overcome and eliminated by providing free-spinning rollers along the outside front edges of each of the movable jaws. In situations where the device cannot be employed by capturing and lifting tires between the jaws, the mule is placed in an orientation in which the rollers engage the vehicle tires. The mule may then be used to push the vehicle by means of the rollers engaging the tires. The rollers are free to rotate as the tires turn, so that the mule can be employed for pushing the vehicle up an incline or onto a dynamometer.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
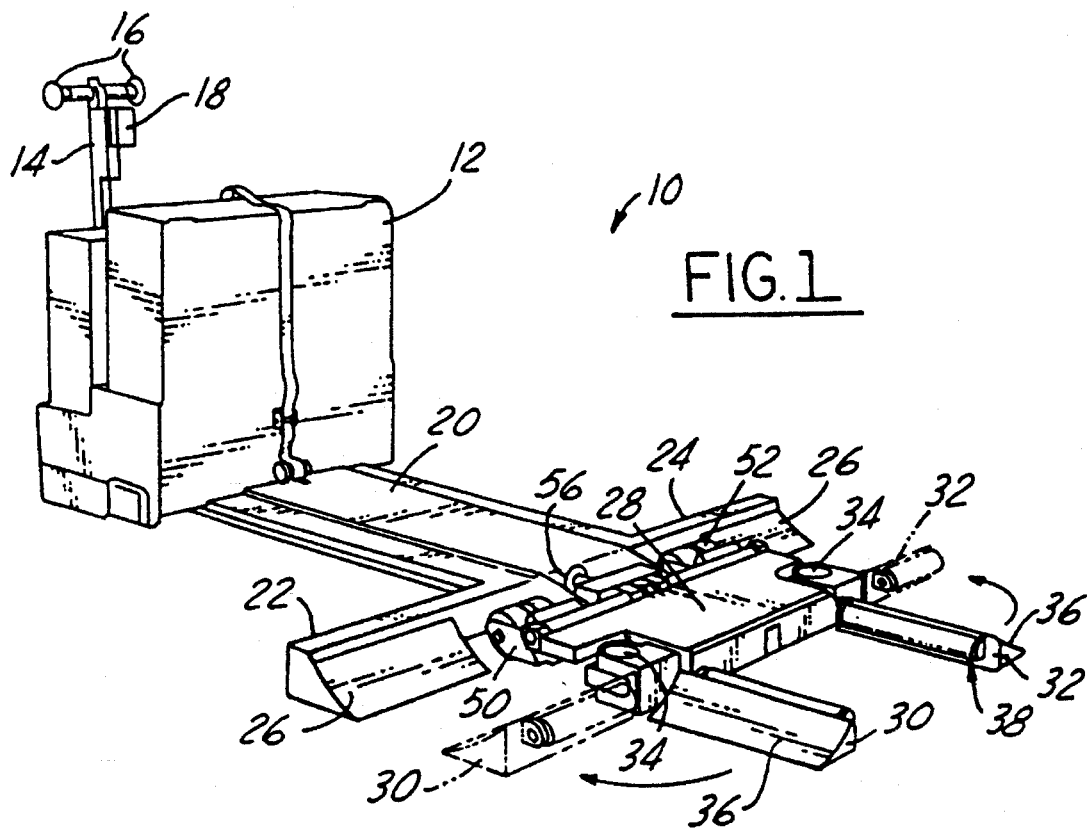
FIG. 1 is a perspective view of a disabled vehicle mover or mule in accordance with a presently preferred embodiment of the invention.
Figure 2:
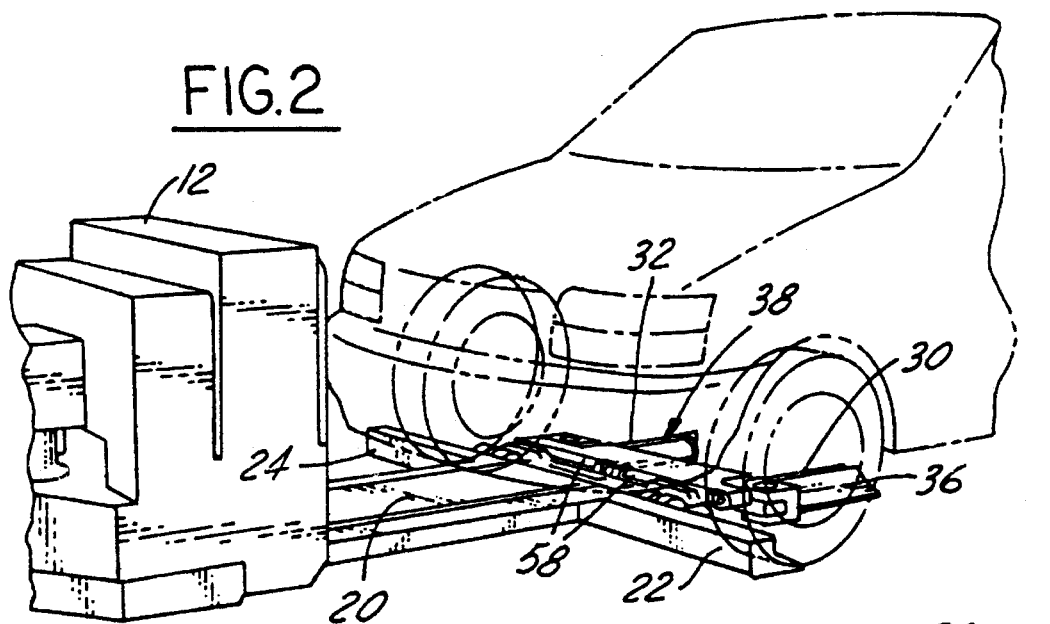
FIG. 2 is a fragmentary perspective view of the device illustrated in FIG. 1 moving into position for engaging a vehicle.
Figure 5:
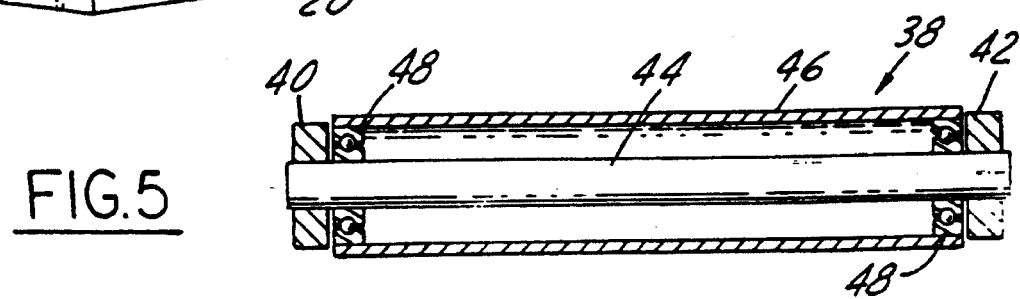
FIG. 5 is a sectional view taken substantially along the line 5—5 in FIG. 3B.

The drawings illustrate a disabled vehicle mover or mule 10 in accordance with a presently preferred embodiment of the invention as comprising a self-propelled truck 12 having a pivotal handle 14 with grips 16 and controls 18 for controlling operation of the mule. A tongue or bar 20 extends longitudinally forwardly from truck 12. A pair of back jaws 22,24 are affixed to and extend laterally outwardly from the forward end of bar 20 in lateral alignment with each other. Each jaw 22,24 has a downwardly and forwardly sloping concave surface 26 for engaging a vehicle tire, as will be described. A head 28 is fixedly and rigidly secured to bar 20 so as to form an integral extension thereof. A pair of front jaws 30,32 are respectively secured to head 28 by a pair of laterally spaced pivot pins 34, thereby being mounted to head 28 so as to pivot horizontally between forwardly extending parallel positions as illustrated in FIGS. 1 and 2, and laterally extending aligned positions longitudinally spaced from back jaws 22,24 as illustrated in phantom in FIG. 1 and in solid lines in FIGS. 3B, 4 and 6. Each jaw 30,32 has a downwardly and outwardly sloping concave surface 34 opposed to surfaces 36 on fixed jaws 22,24.

A roller assembly 38 is mounted for free rotation on the forward or front edge of each jaw 30,32. Each roller assembly 38 comprises a pair of arms 40,42 affixed to and projecting outwardly from the associated jaw 30,32 on side edges thereof remote from tire engaging surfaces 36. Arms 40,42 are spaced from each other lengthwise of the associated jaw. A shaft 44 is affixed to and extends between each pair of arms 40,42 parallel to the associated jaw. Shafts 44 on the respective jaws 30,32 are axially aligned with each other when jaws 30,32 are in their laterally aligned positions illustrated in FIGS. 3B, 4 and 6. A roller sleeve 46 is mounted by spaced bearings 48 for free rotation on each shaft 44, and thus for free rotation with respect to the associated jaw 30,32.

Figure 7:
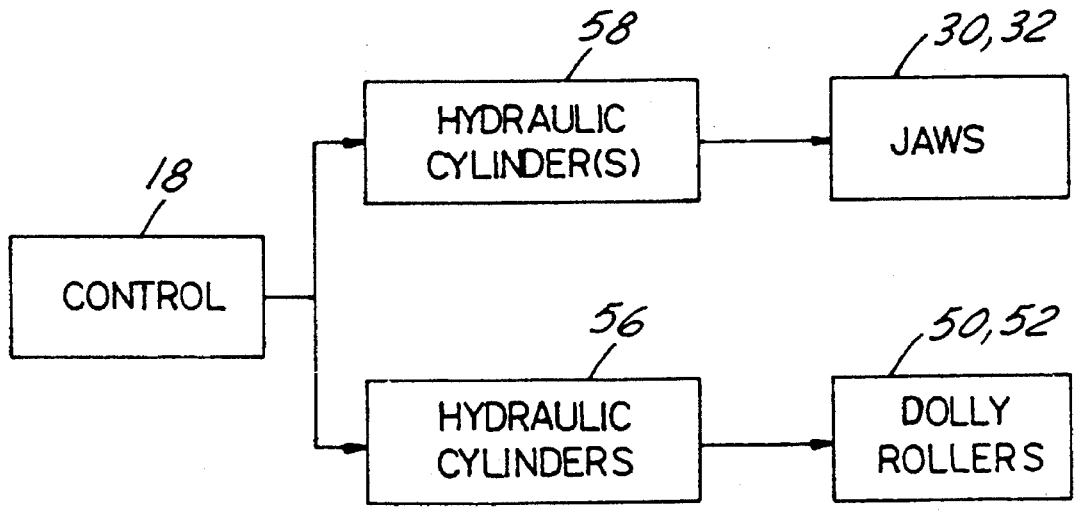
FIG. 7 is a schematic diagram that illustrates the device hydraulics.

Two laterally spaced sets of dolly rollers 50,52 are secured to a rotatable shaft 54 that laterally extends through journals along head 28 at an edge thereof adjacent to bar 20. Dolly rollers 50,52 are laterally aligned with each other and disposed between jaws 22,24. Shaft 54 is coupled by suitable links to a hydraulic cylinder 56, which is operatively coupled to operator control 18 (FIGS. 1 and 7) for selectively extending and retracting cylinder 56, and thereby selectively pivoting shaft 54 and dolly rollers 50,52 conjointly upwardly and downwardly with respect to bar 20 and head 28. Movable jaws 30,32 are likewise coupled to associated hydraulic cylinders 58 (FIGS. 2 and 7). Hydraulic cylinders 58 are coupled to operator control 18 for selectively extending and retracting cylinders 58, and thereby pivoting jaws 30,32 between the longitudinal and lateral positions of the jaws illustrated in the drawings.

In operation for moving a disabled vehicle along a flat floor or other surface, jaws 30,32 are placed in the longitudinally or forwardly extending positions illustrated in FIGS. 1 and 2 by operation of cylinders 58 through operator control 18. Truck 12 is then propelled by the operator through operation of grips 16 so as to move jaws 30,32 between the coaxial vehicle tires to be lifted by the mule, as shown in FIG. 2. The vehicle is illustrated in the drawings as a front-wheel drive vehicle, and the mule is therefore positioned to lift the front drive wheels and tires. (The mule may, of course, also be employed in conjunction with rear-wheel drive vehicles.) Jaws 30,32 are laterally spaced from each other in the longitudinal positions of the jaws (FIGS. 1 and 2) so as to be freely movable between tires of the smallest vehicle in connection with which the mule will be used. Jaws 22,24,30,32 have lengths so as to extend laterally of bar 20 and head 28, in the lateral position of jaws 30,32, so as to capture tires of the widest vehicle in connection with which the mule will be used.

Figure 3A:
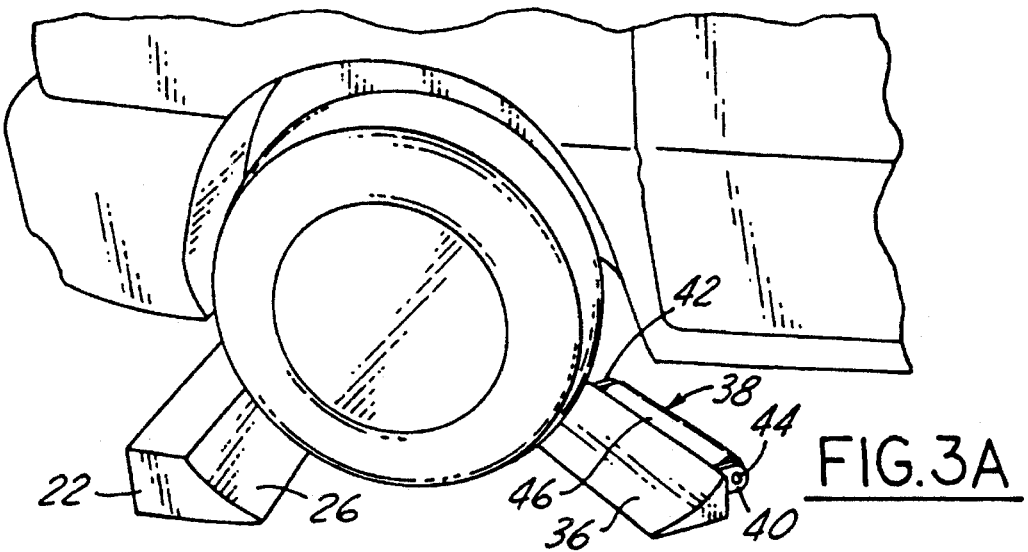
FIGS. 3A and 3B are fragmentary perspective views of the device illustrated in FIGS. 1 and 2 engaging a vehicle tire.
Figure 3B:
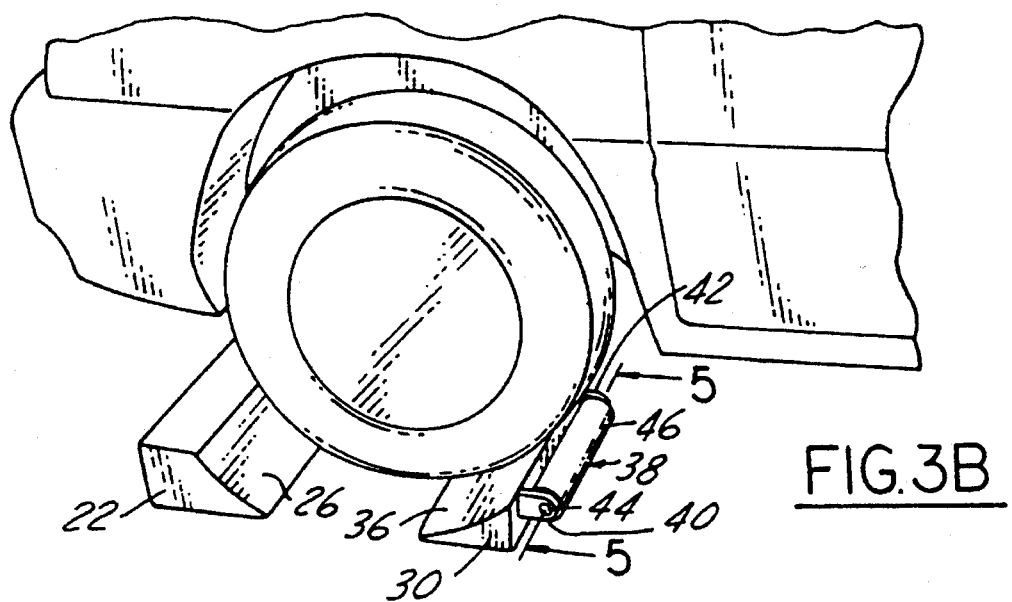
Figure 4:
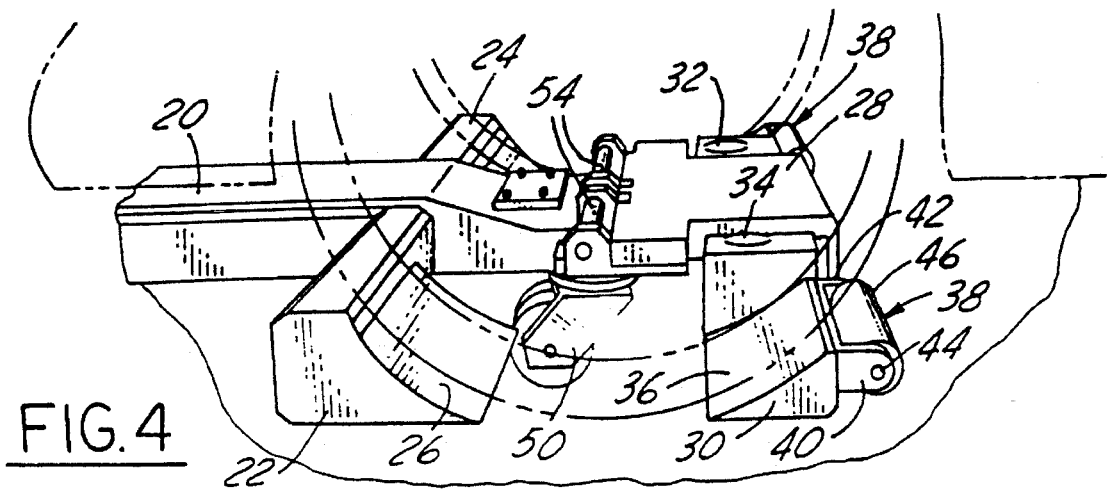
FIG. 4 is a fragmentary elevational view of the device of the present invention lifting a vehicle by means of vehicle tires captured between the device jaws.

With the front jaws 30,32 inserted between the vehicle tires, and back jaws 22,24 snug against the tires as illustrated in FIG. 2, jaws 30,32 are then retracted by cylinders 58 and operator control 18 through the intermediate position illustrated in FIG. 3A to the fully lateral position of the jaws illustrated in FIG. 3B. With the vehicle tires thus captured between opposed jaw pairs 22,30 and 26,32, dolly rollers 50,52 are pivoted downwardly by operation of control 18 and hydraulic cylinder 56. Such downward pivoting of dolly rollers 50,52 lifts bar 20 and head 28 upwardly with respect to the underlying surface so as to lift the opposed jaw pairs, the tires captured between the opposed jaw pairs, and the vehicle suspended on the tires. Truck 12 may then be operated by means of grips 16 so as to propel the disabled vehicle over the surface or floor.

Figure 6:
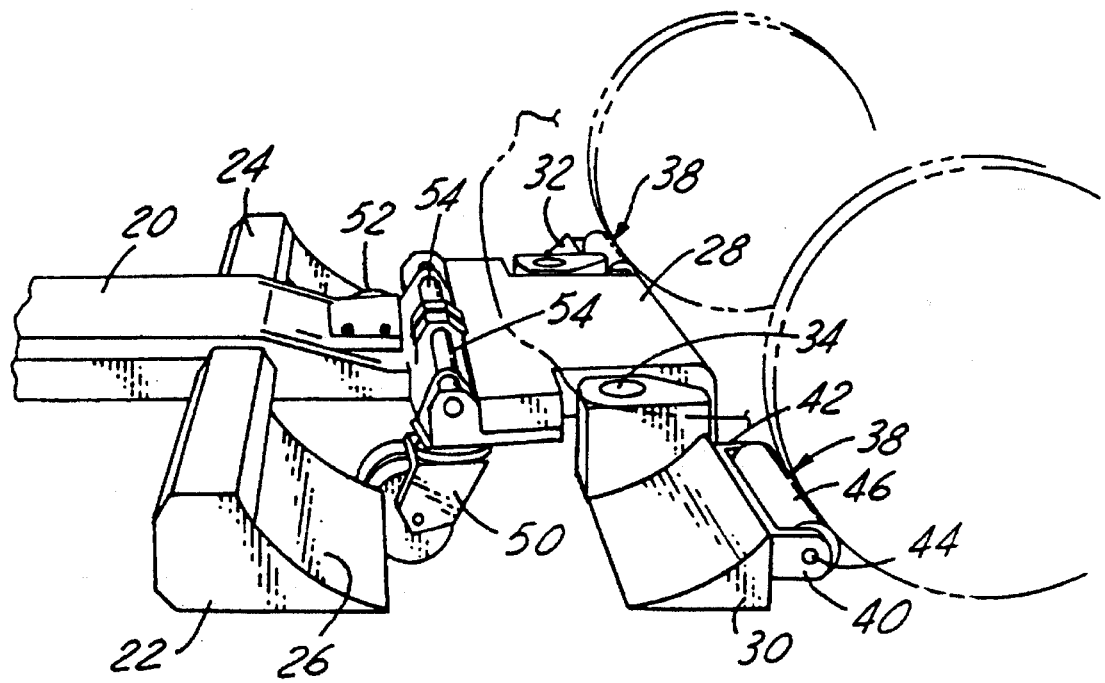
FIG. 6 is a fragmentary elevational view of the device externally engaging the vehicle tires for pushing the vehicle.

In situations in which jaws 22,24,30,32 cannot be positioned beneath the vehicle tires for moving the vehicle, such as when pushing a vehicle onto a dynamometer or up an incline, rollers 38 on jaws 30,32 are employed. That is, movable jaws 30,32 are placed in the laterally aligned positions by operation of control 18 and cylinders 58. With jaws 30,32 in this position, truck 12 is operated by grips 16 so as to place rollers 38 in abutment with the vehicle tires, as illustrated in FIG. 6. Dolly rollers 50,52 are pivoted downwardly by operation of control 18 and hydraulic cylinder 56 as previously described so as to elevate the position of engagement of rollers 38 against the tire surfaces. Truck 12 is then propelled by operator control of grips 16 so as to push the vehicle tires, and therefore the vehicle suspended on the tires, onto the dynamometer or up the incline.

I claim:

1. A device for moving disabled vehicles that comprises:

a self-propelled truck, a bar having a first end affixed to and projecting longitudinally from said truck and an opposite free end, a first pair of jaws affixed to said bar at a location inwardly spaced from said free end and oppositely projecting laterally outwardly from said bar therefrom, a second pair of jaws pivotally mounted to said bar at said free end and projecting from said bar therefrom, means for selectively pivoting said second pair of jaws between longitudinally extending positions in which said second pair of jaws are parallel to each other and spaced from each other to be received between coaxial vehicle tires, and laterally extending positions in which said second pair of jaws are laterally aligned with each other parallel to and opposed to said first pair of jaws and spaced from said first pair of jaws to capture coaxial vehicle tires between said pairs of jaws, means for selectively lifting said bar and said pairs of jaws mounted thereon, said means including ground engaging wheels located proximate said free end portion and roller means mounted on said second pair of jaws along edges thereof remote from said first pair of jaws.

2. The device set forth in claim 1 wherein said roller means are mounted on said second pair of jaws for free rotation about aligned axis when said second pair of jaws are in said laterally extending positions.

3. The device set forth in claim 2 wherein each said roller means comprises a pair of spaced arms affixed to and projecting from the associated jaw, a shaft extending between said arms, and a roller mounted for free rotation on said shaft.

* * * * *